United States Patent [19]

Johnson et al.

[11] Patent Number: 4,507,351
[45] Date of Patent: Mar. 26, 1985

[54] STRONG LAMINATE

[75] Inventors: Robert C. Johnson, Harrison; Larry E. Burns, Goshen, both of Ohio

[73] Assignee: The Proctor & Gamble Company, Cincinnati, Ohio

[21] Appl. No.: 457,313

[22] Filed: Jan. 11, 1983

[51] Int. Cl.³ .............................................. B32B 27/14
[52] U.S. Cl. ..................................... 428/198; 156/291; 428/211; 428/219; 428/284; 428/287; 428/298; 428/342; 428/913
[58] Field of Search ............... 428/198, 211, 219, 284, 428/287, 298, 299, 300, 301, 302, 913, 342; 156/291

[56] References Cited

U.S. PATENT DOCUMENTS

| | | | |
|---|---|---|---|
| 3,301,746 | 1/1967 | Sanford et al. | 162/113 |
| 3,442,736 | 5/1969 | Duns | 428/198 |
| 3,597,299 | 8/1971 | Thomas et al. | 428/110 |
| 3,600,262 | 8/1971 | Frank | 428/247 |
| 3,629,047 | 12/1971 | Davison | 161/57 |
| 3,671,372 | 6/1972 | Hoffman | 428/110 |
| 3,679,347 | 7/1972 | Brown | 8/10.1 |
| 3,687,797 | 8/1972 | Wideman | 428/198 |
| 3,695,985 | 10/1972 | Brock et al. | 428/198 |
| 3,900,632 | 8/1975 | Robinson | 428/196 |
| 3,958,055 | 5/1976 | Hadley et al. | 428/198 |
| 4,142,017 | 2/1979 | Blackburn et al. | 428/284 |
| 4,275,105 | 6/1981 | Boyd et al. | 428/198 |
| 4,287,251 | 9/1981 | King et al. | 428/198 |

FOREIGN PATENT DOCUMENTS 0033988 8/1981 European Pat. Off. .

Primary Examiner—James J. Bell
Attorney, Agent, or Firm—Richard C. Witte; Ronald L. Hemingway; Leonard Williamson

[57] ABSTRACT

A strong laminate with improved tear resistance properties and excellent delamination resistance is disclosed. The laminate comprises a tear strength reinforcing nonwoven center bonded to outer ply tissues utilizing discontinuous thermoplastic masses with controlled penetration of the thermoplastic into the center ply layer.

56 Claims, 5 Drawing Figures

STRONG LAMINATE

BACKGROUND OF THE INVENTION

1. Field of the Invention

This invention relates to modified tissue laminates, and more specifically to a laminate reinforced with a center ply web to improve its tear strength.

2. Description of the Prior Art

Laminates have been prepared by impregnating a central reinforcing web having an open mesh with an adhesive and then placing tissue layers on the upper and lower surfaces of the web. The tissue layers become bonded to the reinforcing web. These tissue laminates are intended to be used as inexpensive substitutes for conventionally woven cloth fabrics. It is a goal of those skilled in the art to achieve clothlike properties which are characteristic of woven fabrics such as drape, bend, strength and absorbency, while at the same time supplying a cost saving substitute.

Laminate tear strength can be attributed to the central reinforcing web. This web can be knitted, woven or nonwoven. If a nonwoven web is used it may be formed by spunbonding, fiber entanglement or needle punching. The fibers used in reinforcing webs may be composed of a natural or synthetic substance such as cotton, rayon, polyamide, polyester, polyolefins, or blends of such substances. The particular fiber selected for reinforcement and the construction of the web are significant factors in the overall strength properties of the laminate. Another goal of those skilled in the art is to produce laminates which have good delamination resistance while maintaining the excellent tear strength of the central reinforcing web.

In addition to tear strength a laminate can also be characterized by flexibility and absorbency. These properties have been generally attributed to the characteristics of the tissue layers, center ply and/or the type and quantity of adhesive used for bonding the layers in the laminate.

Tissue laminates having good tear strength and offering clothlike properties have been produced with varying degrees of success. Some laminates have been successfully substituted for conventional woven fabrics. Prior workers have modified laminate properties by varying the type and quantity of adhesive, the construction of the reinforcing web and/or the type of tissue layer. U.S. Pat. No. 4,142,017, to William A. Blackburn and Roy D. Goodwin, issued Feb. 27, 1979, reported that "a soft and drapable product can be attained with lesser amounts of adhesive but delamination of the individual layers will generally occur. On the other hand, a higher concentration of adhesive will prevent delamination but there will be a sacrifice in laminate aesthetics."

In general, workers in the field have recognized that laminates, especially tissue laminates, having adequate strength and capable of resisting tear would be commercially attractive as alternative materials for conventionally woven and/or knitted fabrics. It has been reported that laminates having the property of resistance to tear can be obtained by using a reinforcing scrim having strong individual fibers capable of substantially unrestricted movement when the laminate is stressed. U.S. Pat. No. 3,629,047, to Robert W. Davison, issued Dec. 21, 1971, recognized that the strength of laminates and particularly tear strength can be enhanced by preventing or minimizing the adherence of the central reinforcing scrim to the outer layers.

Although the prior art reports that the fibers constituting the reinforcing web must have substantial freedom of movement; the accomplishment of such a result has proven to be elusive in the actual fabrication of flexible laminates and particularly tissue laminates. Blackburn et al. '017 taught that many well-known adhesives such as water-insoluble polymer dispersions (latexes) have caused adhesion to take place between the fibers of reinforcing webs and the outer tissue layers. This, according to Blackburn et al., has resulted in restricting fiber movement within the laminate with a resultant decrease in laminate strength properties, particularly tear strength. While Blackburn et al. obtained high tear strengths with their development, by so reducing the adherence of the inner fibers to the outer tissues and adhesive, the amount of latex used to prevent delamination of the outer tissues must be increased so much that the absorbent properties and flexibility of the laminate are substantially reduced.

Fabrics, bonded with thermoplastic adhesives, have been disclosed. U.S. Pat. No. 3,679,347, to Leonard T. Lehmann, issued Oct. 10, 1972, discloses a process of forming air-pervious reinforced nonwoven fabrics which comprises heating a nonwoven web in contact with a thermoplastic net material which has uniformly spaced thick portions connected by thinner strands. The temperature is sufficiently high to melt the net material, causing the strands to draw back into the thick portions making uniformly spaced spots of melted thermoplastic material. Lehmann teaches that the best results are obtained when the thermoplastic encircles and entraps the fibers—Column 2, lines 14–19. This patent is incorporated herein by reference.

Similarly, U.S. Pat. No. 3,900,632, to James E. Robinson, issued Aug. 17, 1975, discloses laminates of tissue and a random laid continuous filament web bonded with a discontinuous adhesive pattern which apparently completely penetrates the center ply and bonds the outer plies to said center ply (See FIGS. 1 and 2 of that patent). While plastisol adhesives are preferred, other adhesives such as hot melts, latexes, or thermoplastic fibers are disclosed. When using this method to produce a laminate, it has now been discovered that the penetration of the adhesive through the central reinforcing ply causes excess interfiber bonding which decreases tear strength.

SUMMARY OF THE INVENTION

The invention is a strong, flexible, and absorbent laminate. The laminate of this invention has a remarkable combination of properties including: (1) high tear strength, (2) good absorbency, (3) excellent lamination strength, and (4) clothlike flexibility. The invention comprises: a tear strength reinforcing nonwoven center ply bonded to outer ply tissues utilizing a discontinuous thermoplastic adhesive material with limited adhesive penetration into the center ply.

The present invention relates to improved clothlike disposable products designed to replace durable woven fabrics. The laminate of this invention is particularly useful for disposable wipers, surgical drapes, towels, clothing and other items.

OBJECTS OF THE INVENTION

It is an object of the present invention to provide better disposable laminates for use as wipers, surgical drapes, clothing and the like.

Another object of the present invention is to provide improved tear strength laminates for use in disposable products.

Yet another object of the present invention is to provide a solvent resistant laminate for use as a disposable wiper.

Other objectives of the invention will be apparent in the light of the following disclosure.

DETAILED DESCRIPTION OF THE INVENTION

Figure 4:
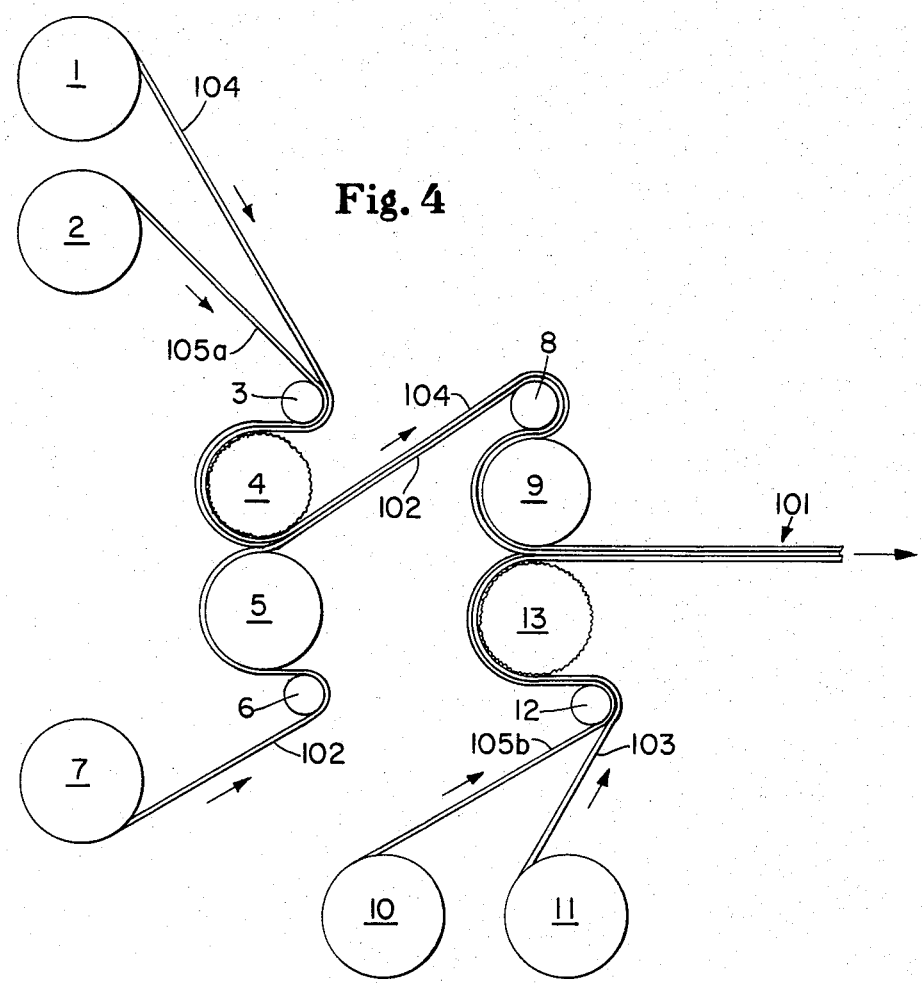
FIG. 4 is a schematic view illustrating an exemplary method of preparing laminates of the present invention using a thermoplastic net adhesive.

The preferred laminates in decreasing order have less than 10%, 15%, 20%, and 25% of the thermoplastic adhesive material fully penetrated into the center ply.

The preferred laminates have an Elmendorf tear strength of greater than 60%, 70% to about 100% of the tear strength of the center ply. The higher the better.

The dry peel strengths of the preferred laminates are greater than either 150 gms, 200 gms, or 250 gms. The water wet peel strengths are greater than either 80, 100, 120, 140, or 160 gms. The acetone wet peel strengths of the laminates are preferably greater than either 80, 100, 120, 140, or 160 gms. As used herein these acetone wet peel strengths indicate that the adhesive is solvent resistant.

The preferred laminates have:
1. An oil absorption capacity greater than 300 g/m$^2$;
2. An Elmendorf tear strength of greater than 225 gms, said laminate having a tear strength greater than 60% of the tear strength of the reinforcing center ply;
3. A wet abrasion weight loss of less than 40 gms;
4. A laminate thickness of from 0.5 to 2.0 mm;
5. A tubular crush of less than 850 gms; and
6. A heat resistance of greater than 200° C.

Outer Ply Tissue

The outer ply tissues can be wide ranging including standard paper tissues, strengthened tissues, and tissues which will be processed after lamination to provide special properties. A preferred outer ply tissue has a:

Basis Weight—7, 20, 60, 90, 100 to 130 g/m$^2$
Oil Absorbent Capacity—>175 g/m$^2$
Low Load Thickness—0.4, 0.8 to 1.2 mm Such a tissue can be made on a twin wire tissue machine using a process to make tissues like those disclosed in U.S. Pat. No. 3,301,746, to Lawrence H. Sanford and James B. Sisson, issued Jan. 31, 1967, incorporated herein by reference. If surface strength is desired, the tissue of '746 can be strengthened after lamination by surface printing with a pattern of latex binder to obtain a final laminate having excellent abrasion resistance. The choice of a pattern and binder can be made by those skilled in the art of strong, surface bonded tissue making.

A preferred outer ply tissue has a:
Basis Weight—33 g/m$^2$
Oil Absorbent Capacity—193 g/m$^2$
Low Load Thickness—0.47 mm This material is surface strengthened in accordance with the method disclosed on Pages 9 and 10 of commonly assigned European Pat. Appln. Ser. No. 33988, Aug. 19, 1981, incorporated herein by reference in its entirety. Similar surface strengthened tissues are commercially available from Scott Paper Company, Philadelphia, Pa., and are sold under the trade name of Hi-Loft ®.

The Center Ply Material

The center ply can be any appropriate reinforcing nonwoven web, e.g., spunbonded, fiber-entangled, needle punched, adhesive bonded after carding, etc., as disclosed above in the Background. Spunbonded nonwoven material is preferred. An example of a preferred center ply material is Reemay ® sold by DuPont, Wilmington, Del.

Reemay ® is a polyester fibrous material which typically has:
1. A tear strength of 997 gms; and
2. A basis weight of 17 g/m$^2$.

Laminating Adhesive or Binder Material

The laminating adhesive of this invention is a thermoplastic adhesive which can be applied in a net adhesive sheet form or in a printed pattern in a molten form. The choice of thermoplastic material to be used can be selected by those skilled in the art. for the specific end use. Preferred thermoplastics are high and low density polyethylene, polypropylene, polyesters, polyamides, ethylene copolymers such as ethylene-propylene copolymers, ethylene-vinyl acetate copolymers, ethylene-methyl acrylate copolymers, etc.

A particularly preferred adhesive is a thermoplastic net material available from Hercules Incorporated under the trade name Delnet ®. Many patterns, masses per square inch, and basis weights are available. Preferred materials are high and low density polyethylene and polypropylene. One such material is high-density polyethylene and is designated Delnet X550.

EVALUATION OF PROPERTIES

The physical properties of the laminates and/or starting materials used in the present invention were determined by the procedures set out below. One inch (1") is equal to 2.54 cm.

Vertical Oil Absorption Capacity Test

Principle

A measurement of the oil absorptive capacity of an absorbent material is obtained by determining the amount of oil retained in a 10"×10" sample of material which has been soaked in mineral oil and then allowed to drain for 20 minutes.

Apparatus

1. Balance with 0.01 gm accuracy
2. Cutting board
3. 9"×12" pan
4. 1000 ml beaker
5. 2 ring stands and appropriate clamps to suspend sample
6. Timer
7. Mineral Oil—Fisher Sci. Catalog #0-199—white, light Saybolt viscosity 125/135.

Sampling

A minimum of 6 samples should be tested. Samples should be free of creases or folds and cut exactly 10"×10".

Procedure

All testing should be done at room temperature, 20° C. (70°-72° F.). First record the dry weight of each sample to the nearest 0.01 gm. The sample is then submerged in a pan of mineral oil for 1 minute. The sample is then hung by its corners using binder clips attached to a cross arm which is supported by the ring stands. The sample should be positioned so that the top edge is held straight and level. A minimum of 3 samples are tested with the machine direction perpendicular to the lab bench during draining (position A) and 3 samples with the cross direction perpendicular to the lab bench during draining (position B). While the sample is draining, weigh a 1000 ml beaker to the nearest 0.01 gm. After allowing the sample to drain for 20 minutes, carefully remove it from the ring stands, place it in the pre-weighed beaker and weigh the beaker plus the wet sample to the nearest 0.01 gm. The wet weight of the sample can be determined by subtracting the weight of the beaker from the weight of the beaker plus the wet sample. To obtain the grams of oil retained by the sample, subtract the dry weight of the sample from the wet weight.

Report

1. Grams of oil absorbed by 100 sq.in. sample. Report to nearest 0.01 gm the average of all 6 samples.
2. Grams of oil absorbed/m² using the following equation:

$$\text{gms oil/m}^2 = (\text{gms oil/100 sq.in}) \times (1 \text{ sq.in.}/0.000645 \text{ m}^2).$$

Water Wicking Rate Test

Principle

Determine the time in seconds required for a sample to absorb 0.10 ml of distilled water using a timer.

Apparatus

1. Reid Tester
2. Timer

Apparatus Description

The "Reid Tester" consists of a glass reservoir approximately 500–600 ml in volume. A 3-way valve is connected to the reservoir by tygon tubing. The distilled water in the instrument reservoir is allowed to flow from both the orifice or the open tip of the pipette, depending on the position of the 3-way valve. The leveling feet are connected to the base so that the Plexiglas plate of the tester is exactly level.

Sample

Cut 3" wide sample strips across the roll (20" roll). Run six tests per sample strip, two strips per sample.

Apparatus Preparation

1. New or very infrequently used testers should be washed out with 0.5N hydrochloric acid. Allow this acid to remain in the tester for several hours, drain and refill with fresh acid for an additional 1–3 hours. Flush tester thoroughly with distilled water at least five times until pH is the same as the distilled water and no chloride ion remains.
2. Pressure flush this apparatus with distilled water each day before operation.
3. Carefully adjust the leveling feet so that the Plexiglas plate of the tester is exactly level.

Procedure

1. Make sure no air is entrained anywhere in the tubing/pipette assembly, and that the pipette tip is filled and any drops absorbed from the Plexiglas plate.
2. Turn 3-way stopcock to fill the calibrated pipette. Absorb the drops from the open end and shut off stopcock so that the pipette is exactly at 0.10 ml.
3. Place one end of the sample strip over the lower plate and cover with top plate.
4. Turn the stopcock so the red dot is straight up.
5. Immediately start the timer if the water begins to wick from the calibrated pipette; if not, tap the top of the Plexiglas plate until the wicking begins and immediately start the timer.
6. As soon as the water crosses the zero (0) line, stop the timer and shut the stopcock. Record to one-tenth second.
7. Move the sample approximately three inches further down the strip and turn it over. Repeat from Step 2. Report as average number seconds.

Peel Ply Strength Test

Principle

A measurement of ply-to-ply bonding strength is obtained by measuring the amount of force required to separate the plies of a laminated material using a tensile tester.

Apparatus

1. Tensile tester equipped with a tensile load cell (0.2000 gm range). Thwing Albert Tensile Tester Model QCII is recommended; however, an Instron can also be used.
2. Paper Cutter-TMI one inch strip cutter or equivalent is recommended.
3. Solvents.

Sample

Cut test strips 1"×10". Test a minimum of 5 samples in each direction.

Dry Procedure

Jaws on the tensile tester are set 4" apart. Jaw separation speed is 1"/min. The readout is in grams and is set to record the maximum amount of resistance which occurs during the test. The level distance of the jaw is manually controlled between 2 and 1.5 inches during the test. The plies of the test strip are manually separated for approx. 2–3 inches. The end of one ply is placed in the upper jaw and the end of the other ply is placed in the lower jaw, being careful to keep the edge of the strip in alignment with the vertical edges of the jaws. After allowing the tester to peel the plies for a distance of 1 to 1.5 inches, the maximum force exerted on the plies is recorded, the jaws are returned to the starting position, and the sample is discarded.

Wet Procedure

Same procedure used for dry peel ply strength, except the strips are soaked in solvent for one minute before testing. Samples should be tested within 30 seconds after removing them from the solvent.

Report

Maximum grams of force required to separate the plies to the nearest gram using the average of 5 readings in each direction, whether tested dry or wet and what solvent used.

Basis Weight Test

Scope

A weight measurement is obtained by using an analytical balance and a specifically sized sample (either structure or individual layer).

Apparatus

Analytical balance.

Sample

Cut 5 specimens, 10"×10".
Condition a minimum of four hours at 50° RH, 73° F.

Procedure

Weigh each sample. Record.
Multiply each weight by 15.5 to give g/m².
Average those weights for an overall measure.

Report

The average basis weight in g/m² for each structure or nonwoven. 1 lb/3000 sq.ft.=1.63 g/m².

Tear Strength Test

The tear strength test is measured using the Standard Test Method for Tear Resistance of Woven Fabrics by Falling-Pendulum (Elmendorf) Apparatus (ANSI/ASTM D 1424-63 (Reapproved 1975)).

In this method the average force required to continue a tongue-type tear in a fabric is determined by measuring the work done in tearing the fabric through a fixed distance. An average of ten determinations is made and the tearing force is reported in grams. It is well known in the art that tissue laminate tear strength is commonly referred to as the "Elmendorf Tear Strength." For purposes of this description the terms "tear strength" and "Elmendorf Tear Strength" are synonymous.

Wet Abrasion Resistance Test

The abrasion resistance of a material is measured using the Standard Test Method for Abrasion Resistance of Textile Fabrics by uniform abrasion method (Schiefer Abrasion Tester using ASTM D 1175-80). Round samples of fabric (3½" diameter) are cut to be tested. The samples are conditioned overnight at 25° C./50% RH before taking the initial weighing.

The samples are then weighed to the nearest 0.0001 gm. Each sample is then placed on a Schiefer Abrasion Tester with the counter-balance attached; no additional weights are used. The abradant is a spring steel blade (accessory #3 for Schiefer Abrasion Tester).

A 2" diameter presser foot (accessory #6 for Schiefer Abrasion Tester) is used as the back up plate.

Two cubic centimeters of water are put in the center of the sample and allowed to soak into the fabric for 1 minute before testing. The fabric is abraded for 1 minute. The sample is then removed, dried in an oven for 2 hours at 120° C. and reconditioned overnight at 25° C./50% RH. The sample is then reweighed to determine the amount of material lost. Weight loss is recorded in milligrams. A low number is desired for abrasion resistance.

Low Load Thickness Test

The low load thicknesses were obtained using the Standard Method for Measuring Thickness of Textile Materials (ANSI/ASTM D 1999-64 (Reapproved 1975)).

Temperature Resistance Test

Scope

The ability of a laminate sample to withstand high temperature without flowing or flaming is determined by placing samples in intimate contact with a hot surface for a specified period of time.

Apparatus

3"×3" metal block (32 oz.)
8"×8" sheet metal
Hot Plate
Wahl Digital Heat Prober Thermometer

Sample

Cut wipers 3"×3".

Procedure

1. Using a hot plate, a square of sheet metal is heated from 350° F. (180° C.) to 600° F. (320° C.) in 50° F. (30° C.) increments.
2. At each level, the 3"×3" sample is placed on the metal and covered with the weight block giving an approximate 0.5 psi pressure.
3. After 30 seconds, remove the weight and sample and check for visual damage.
4. Use the heat prober between each sample to make sure the temperature is constant at each level.

Report

The "failure point" of each sample. Failure point in this test being the temperature causing melting or flowing of a layer or latex, or smoking of the structure indicating a near flame point.

Tubular Crush Test

Scope

A measurement of flexibility is obtained by compressing a round tube of material against a flat surface. The test is intended for use on nonwovens, woven fabrics, and films.

Principle

A sample is wound, two complete turns, around a 1" diameter rod with one inch each of the sample extending beyond one end of the rod and taped in place. This extending tube of fabric is pressed against a flat surface until it crumples. The maximum force in grams to crumple the tube is reported as the "Tubular Crush."

Apparatus

1. Paper cutting board.
2. Instron Tensile Tester equipped with a compression load cell (0-2000 gm range).
3. A sample holding rod having a 1" diameter with a flat end of insertion into the Tester (2) jaws.
4. Paper masking tape ¾" wide.

Sample

Cut five specimens in cross machine and five with machine direction 2"×7". Condition a minimum of two hours at 50% RH and 73° F. (23° C.).

Procedure

Tape the beginning of the sample to the sample holding rod. Wrap and 7" length around the rod with a 1" overhang from the end of the rod. Secure the sample to holder with ¾" wide masking tape. Wrap the tape completely around the edge of the sample with ½ of the tape width contacting the rod and the other half contacting ½ the sample. Wind another piece of tape around the sample, line the tape edge with the shoulder represented by the top of the sample. About ¼" of the sample on the rod will not be taped. The one inch of the sample that extends beyond the rod end must not be taped or secured by any method. Insert the holder with the sample in the Instron jaws and measure the force required to crush the sample. Test three specimens in each direction (cross machine and machine).

Report

The average force in grams to crush the sample for machine and cross-machine direction.

Degree of Adhesive Penetration Test

This test is used to estimate the degree of adhesive penetration of the masses or spots into the center ply of the laminate. The laminate is first embedded in an epoxy resin, then thin (160 microns) cross-sections about one inch long are viewed under a microscope at a 40X power. Each bond in each cross-section is observed and rated as (1) no penetration—the adhesive spot or mass is not connected to the center ply, (2) partial penetration—the adhesive spot is surface bonded or penetrated less than 40% in the center ply, or (3) full penetration—the adhesive is substantially penetrated into the center layer. The side of origin of both an unbonded (1) and a partially bonded (2) adhesive can readily be seen under the microscope. Every bond in ten different cross-sections is examined and rated. The average percent of each type bond is recorded.

DETAILED DESCRIPTION OF THE DRAWINGS

Figure 1:
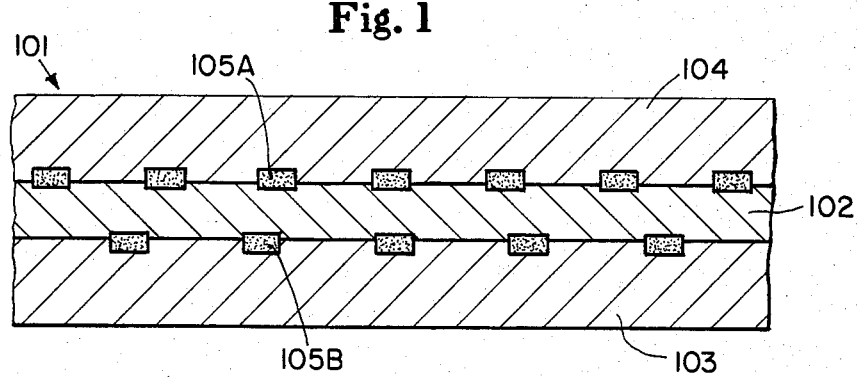
FIG. 1 is a cross-sectional view of a three-ply tissue laminate of the present invention.

FIG. 1 is a cross-sectional view of a laminate 101 showing elements:
102. The center ply;
103. The lower outer tissue ply;
104. The upper outer tissue ply;
105a. Adhesive masses or spots between upper tissue ply and center ply.
105b. Adhesive masses or spots between lower tissue ply and center ply.

Figure 2:
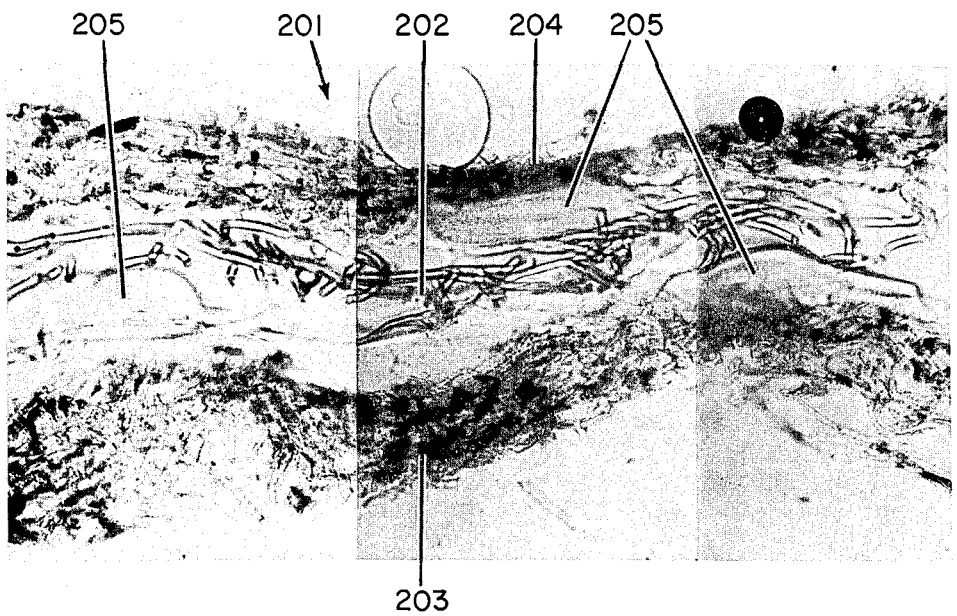
FIG. 2 is a photomicrograph of a cross-section of a three-ply tissue laminate of the present invention showing minimal penetration of adhesive masses into the central reinforcing layer.

FIG. 2-Table of Elements

201. Photomicrograph (40X) of a portion of a 160 micron cross-section of laminate of the invention described in Example I;
202. The center reinforcing ply, Reemay ®;
203. Lower tissue ply;
204. Upper tissue ply;
205. Partially bonded (penetrated) thermoplastic adhesive spot showing less than 40% penetration into center ply.

Figure 3:
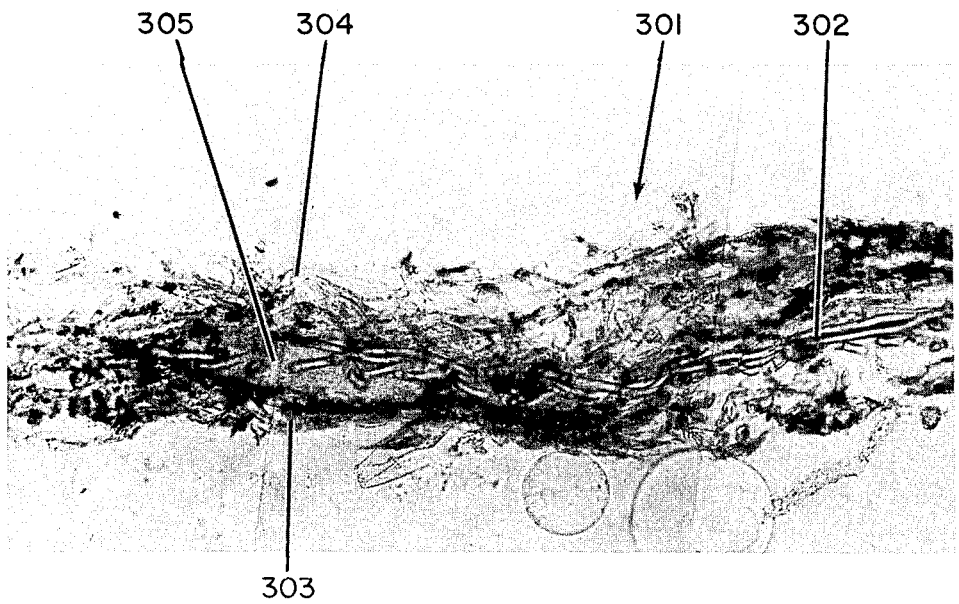
FIG. 3 is a photomicrograph of a cross-section of a prior art laminate showing full penetration of adhesive masses through the central reinforcing layer.

FIG. 3-Table of Elements

301. Photomicrograph (40X) of a portion of 160 micron cross-section of a prior art laminate described in Example III;
302. Center ply;
303. Lower tissue ply;
304. Upper tissue ply;
305. Fully bonded adhesive.

Method of Making Laminate

Referring to FIG. 4, tissue 104 from the first tissue supply roll 1 and net adhesive material 105a from the first net adhesive supply roll 3 is threaded around an idler roll 2 and onto a first heated embossing roll 4 to be preheated. The center ply 102 from the center ply supply roll 7 is threaded around an idler roll 6 and onto a first rubber combiner roll 5 where it is bonded with heat and pressure to the top tissue ply 104 with the thermoplastic net adhesive 105a forming spot bonds. This material is threaded around another idler roll 8 and onto a second rubber combiner roll 9. Tissue 103 from the second tissue supply roll 11 and net adhesive material 105b from the second net adhesive supply roll 10 are threaded around an idler roll 12 onto a second heated embossing roll 13 where it is bonded with heat and pressure to the bottom side of the center ply layer. The so made laminate 101 cools and can be flexibilized (not shown) with various ring roll and/or microcreping devices.

Figure 5:
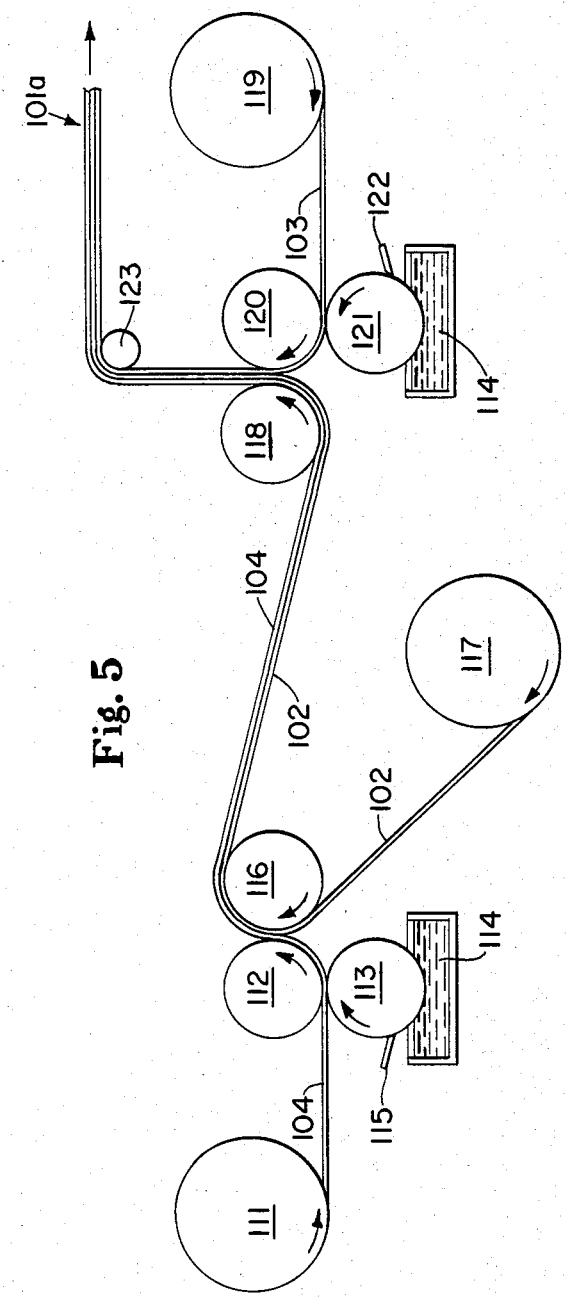
FIG. 5 is a schematic view illustrating an alternative exemplary method of preparing laminates of the present invention using a hot melt thermoplastic adhesive.

An alternate method of making the laminate of this invention is as follows:

Referring to FIG. 5, tissue 104 from the first tissue supply roll 111 passes between a first backup roll 112 and a first patterned heated gravure roll 113 which is coated in a pattern with molten thermoplastic adhesive 114 which is metered onto said gravure roll 113 with a doctor blade 115. The tissue 104 while printed with molten adhesive is combined with center ply material 102 from a center ply supply roll 117 which wraps around a first combiner roll 116 which combines said center ply 102 with said printed tissue. This material then wraps a second combiner roll 113 where it is combined with tissue 103 from a second tissue supply roll 118, said second tissue passing between a second backup roll 120 and a second patterned heated gravure roll 121 which is coated in a pattern with molten thermoplastic adhesive 114 which is metered onto said gravure roll 121 with a doctor blade 122. After passing an idler roll 123, the so made laminate 101a cools and can be flexibilized (not shown) with various ring roll and/or microcreping devices.

EXAMPLES

In order that the present invention may be readily understood, the following examples are given by way of illustration, but are not intended to be in any way a limit on the practice of the invention.

The three-ply laminate illustrated in FIG. 1 is referred to in the examples. The process used to make the laminates in Examples I and II is illustrated in FIG. 4.

EXAMPLE I

A three-ply laminate demonstrating the benefits of this invention, particularly useful as a solvent resistant wiper material, as illustrated by FIGS. 1 and 2. This laminate 101 was made with a center ply 102 of spunbonded, nonwoven polyester fibrous material having a basis weight of 17.0 g/m$^2$ and a tear strength of 997 grams. This material was purchased from DuPont, Wilmington, Del., under the tradename Reemay ®2250.

The outer ply tissue layers 103 and 104 were strengthened cellulosic tissues made in accordance with the method disclosed on page 9, line 33 to page 10, line 18 of commonly assigned European Pat. Appln. Ser. No. 33988, June 19, 1981, incorporated herein by reference in its entirety. The tissue was produced on a twin-wire tissue machine with the same furnish make-up and additives as used in Example 1 of said European patent application. A 24×20 filaments per in. polyester fabric was used and latex binder was applied with a gravure cylinder using a 20% solids mixture of Rohm and Haas TR-520 acrylic latex to achieve a level of about 8.0% by weight of binder solids on the tissue. These tissues 103 and 104 has a basis weight of 33 g/m$^2$, an oil absorption capacity of 193 g/m$^2$, and a low load thickness of 0.47 mm.

A thermoplastic solvent resistant adhesive net material (105a and 105b) comprising uniformly spaced solid thermoplastic masses connected by oriented thermoplastic strands which are thinner than the said solid masses, was used to thermally bond the outer plies 103 and 104 to the upper and lower surfaces of the center ply layer 102. This net adhesive material was Delnet X550 made of high density polyethylene from Hercules Incorporated, Wilmington, Del., and has 65–80 masses per sq.cm. at a basis weight of 11 g/m$^2$.

The lamination of these plies was achieved using the equipment and method generally illustrated in FIG. 4 by first passing the top tissue 104 and the top adhesive net material 105a around a preheated embossing roll 4 and combining them to the top side of the center ply 102 which wraps a rubber covered combiner roll 5, the roll temperatures being about 165° C. (330° F). The laminating speed was 12 meters per min. (40 ft/min) and the force on the combiner was 100 Newtons/cm (55 lb/in).

Since a second combiner system was not available, the top tissue plus center ply laminate was placed on the center ply supply roll 7 with the bottom side of the center ply up. This was laminated in a like manner to a second tissue ply and second adhesive net material by passing around a heated embossing roll 4 and combiner roll at a temperature of 165° C. (330° F.), at 6 m/min. and at a combiner pressure of 125 Newtons/cm. to obtain the laminate 101. These conditions gave good lamination peel strength while limiting the bonding to about 8% of the thermoplastic adhesive masses (about 5 masses per sq.cm.) being fully penetrated into the center ply. The lamination peel ply strength was 237 gms dry, 137 gms wet with water, and 155 gms when soaked in acetone.

The laminate material was then flexibilized by first passing it through a pair of grooved steel rolls which are meshed to elongate the laminate 6% in the cross-machine direction. The ring rolls used were 36" long with 8" diameters with each having 10 grooves per inch of length. The rolls are meshed and the gap between them was set to elongate the laminate about 6%. Next the laminate was microcreped with a 16 inch wide "Micrex" machine at 12 to 18 crepes per inch and 10% negative draw to finish the flexibilization process. The "Micrex" machine was a standard unit purchased from Bird Machine Co., South Walpole, Mass. The so made laminate exhibits the following properties:

Elmendorf Tear Strength—992 gms.
Tear Strength-% of Center Ply—99%
Oil Absorbent Capacity—435 g/m$^2$
Tubular Crush—382 gms.
Thickness—0.92 mm
Wet Abrasion Weight Loss—0.3 mg.
Heat Resistance—200° C.
Basis Weight—117 g/m$^2$
Degree of Bonding:
  Full Penetration—8%
  Partial Penetration—61%
  No Penetration—31%

This laminate is particularly useful as an industrial wiper with its excellent tear strength and excellent solvent resistance.

EXAMPLE II

Another laminate made according to this invention was laminated with a thermoplastic net adhesive in a like manner to Example I, except a standard tissue was used and was strengthened after lamination. The tissue was like those disclosed and claimed in U.S. Pat. No. 3,301,746, to Lawrence H. Sanford and James B. Sisson, issued Jan. 31, 1967, incorporated herein by reference. The tissue had a basis weight of 31 g/m$^2$, an oil capacity of 219 g/m$^2$, and a low load thickness of 0.50 mm. After lamination, the laminate was surface strengthened by printing a 17 line per inch diamond pattern with 30% of the surface area of the laminate being covered with Rhoplex HA20 latex (Rohm and Haas (Co.). This latex was applied at a level of 4.3 g/m$^2$ of binder solids on each side of the laminate.

The laminate had a peel strength of 263 gms dry, 155 gms wet with water, and 147 gms when soaked in acetone. The so made laminate exhibited the following properties:

Elmendorf Tear Strength—733 gms.
Tear Strength-% of Center Ply—74%
Oil Absorbent Capacity—433 g/m$^2$
Tubular Crush—370 gms.
Thickness—0.83 mm
Wet Abrasion Weight Loss—2.0 mg.
Heat Resistance—200° C.
Basis Weight—127 g/m$^2$
Degree of Bonding:
  Full Penetration—5%
  Partial Penetration—69%
  No Penetration—26%

The laminate is particularly useful as an industrial wiper with its excellent tear strength and excellent solvent resistance.

Those skilled in the art will readily see that different tissue finishing methods from those disclosed in Example 2 could be employed to obtain desirable properties for other end uses where the increased tear strength of this invention would be very useful.

EXAMPLE III

This example illustrates a prior art method of making a laminate using a thermoplastic net adhesive material. A laminate was made using the same outer ply tissues, center ply, and adhsive net material as in Example 1. However, the laminate process described in U.S. Pat. No. 3,697,347, to Leonard T. Lehmann, issued Oct. 10, 1972, incorporated herein by reference, was utilized. The conditions were taken from Example I of the '347 patent which is representative of that disclosure. A heated platen press was used to make the laminate wherein the press temperature was 149° C. (300° F.), the pressure was 10 psi on the material, and this was held for 3 minutes. The so made laminate exhibited the following properties:

Elmendorf Tear Strength—266 gms.
Tear Strength-% of Center Ply—32%
Thickness—0.61 mm
Degree of Bonding:
 Full Penetration—80%
 Partial Penetration—20%
 No Penetration—0%

This laminate shows poor tear strength compared to examples of the present invention with no benefit in tear strength over certain prior art lamination methods such as latex saturation.

Several other laminating conditions using the platen press were tested with conditions down to 135° C. (215° F.) and down to 2 seconds and no sample exhibited acceptable peel strength and high tear strength at the same time.

EXAMPLE IV

This example illustrates other prior art.

Example IV utilized the same type outer ply layers and center ply as used in Example I. The strengthened outer ply tissue had a basis weight of 33 g/m², an oil absorbent capacity of 198 g/m², and a thickness of 0.50 mm. The center ply had a tear strength of 882 g. and a basis weight of 17.0 g/m².

The layers were laminated by saturating the center ply with a latex emulsion, combining with the tissues, and drying as disclosed in U.S. Pat. No. 4,133,911, to Larry L. LaFitte and James B. Camden, issued Sept. 12, 1978, incorporated herein by reference (Column 9, line 66 to Column 10, line 14). The laminate was flexibilized in a like manner to Example I and has the following properties:

Elmendorf Tear Strength—317 gms.
Tear Strength-% of Center Ply—36%
Oil Absorbent Capacity—375 g/m²
Tubular Crush—380 gms.
Thickness—0.77 mm
Basis Weight—97 g/m²

While this laminate a good industrial wiper material, the superior tear strength and peel strength, wet and dry, of the present invention provide a significant was unexpected improvement thereover.

What is claimed is:

1. A three-ply laminate comprising:
 A. Absorbent paper tissue outer plies each having a basis weight of 7 to 130 g/m²;
 B. A flexible tear reinforcing center ply having a tear strength of at least 300 gms.; and
 C. A thermoplastic net adhesive material originally having uniformly spaced solid thick thermoplastic masses connected by oriented thermoplastic strands which are thinner than said solid masses; wherein the outer plies (A) are bonded to the upper and lower surfaces of said center ply (B) by the adhesive (C), wherein less than 30% of said solid masses are fully penetrated into the center ply; and wherein said laminate has an Elmendorf tear strength equal to at least 50% of the tear strength of the reinforcing center ply, and wherein said laminate has a dry peel strength of greater than 100 gms.

2. A three-ply laminate comprising:
 A. Absorbent tissue outer plies each having a basis weight of 7 to 130 g/m²;
 B. A flexible tear reinforcing center ply having a tear strength of at least 300 gms.; and
 C. A thermoplastic adhesive material having a uniformly spaced pattern of spots between (A) and (B) with less than about 30% of said spots fully penetrating into the center ply;
said laminate having an Elmendorf tear strengh of at least 50% of the tear strength of the reinforcing center ply, said laminate having a dry peel strength of greater than 100 gms.

3. The invention of claim 1, or 2, wherein said (B) is a nonwoven material selected from the group consisting of spunbonded, fiber-entangled, needle punched and adhesive bonded after carding materials; and wherein said (B) has a tear strength of at least 500 gms.

4. The invention of claim 3 wherein (B) is a spunbonded material with a tear strength of at least 900 gms.

5. The invention of claim 4 wherein said tear strength is at least about 1100 gms.

6. The invention of claim 5 wherein (B) has a tear strength of about 1600 gms.

7. The invention of claim 1, or 2, wherein said absorbent tissue outer ply has a basis weight of from about 7 to 100 g/m².

8. The invention of claim 7 wherein said tissue has a basis weight from 7 to 60 g/m².

9. The invention of claim 8 wherein said tissue has a basis weight from 7 to 20 g/m².

10. The invention of claim 1, or 2, wherein said thermoplastic adhesive material is made from a material selected from the group consisting of thermoplastics of high and low density polyethylene, polypropylene, polyesters, polyamides, ethylene copolymers such as ethylene-propylene copolymers, ethylene-vinyl acetate copolymers, and ethylene-methyl acrylate copolymers.

11. The invention of claim 10 wherein said adhesive is high density polyethylene.

12. The invention of claim 1 wherein said thermoplastic adhesive is an open network which has: 10 to 200 masses per sq.cm., a basis weight of 5 to 50 g/m², and a thickness of 0.02 to 0.40 mm.

13. The invention of claim 12 wherein said network has: 20 to 150 masses per sq.cm., a basis weight of 5 to 40 g/m², and a thickness of 0.05 to 0.3 mm.

14. The invention of claim 13 wherein said network has: 50 to 100 masses per sq.cm., a basis weight of 5 to 20 g/m², and a thickness of 0.05 to 0.2 mm.

15. The invention of claim 1 wherein less than 25% of said masses are fully penetrated into said center ply.

16. The invention of claim 15 wherein less than 10% of said masses are fully penetrated into said center ply.

17. The invention of claim 1, or 2, wherein said laminate has an Elmendorf tear strength equal to 60% to 100% of the tear strength of the reinforcing center ply.

18. The invention of claim 17 wherein said Elmendorf tear strength is 70% to 100% of the tear strength of said center ply.

19. The invention of claim 1 wherein said dry peel strength is greater than 150 gms.

20. The invention of claim 19 wherein said dry peel strength is greater than 250 gms.

21. The invention of claim 1, or 2, wherein said laminate has a water wet peel strength of greater than 100 gms.

22. The invention of claim 21 wherein said water wet peel strength is greater than 160 gms.

23. The invention of claim 1, or 2, wherein said laminate has an acetone wet peel strength of greater than 80 gms.

24. The invention of claim 23 wherein said acetone wet peel strength is greater than 160 gms.

25. The invention of claim 23 wherein said thermoplastic adhesive is solvent resistant.

26. The invention of claim 1, or 2, wherein said absorbent tissue outer plies each has:
 1. a basis weight of 7 to 130 g/m$^2$;
 2. an oil absorption capacity greater than 175 g/m$^2$; and
 3. a low load thickness of 0.4 to 1.2 mm;
wherein said laminate has:
 1. an oil absorption capacity of greater than 300 g/m$^2$;
 2. an Elmendorf tear strength of greater than 225 gms., said laminate having a tear strength greater than 60% of the tear strength of the reinforcing center ply;
 3. a wet abrasion weight loss of less than 40 mg.;
 4. a thickness of from 0.5 to 2.0 mm;
 5. a tubular crush of less than 850 gms.; and
 6. a heat resistance of greater than 200° C.

27. The invention of claim 2 wherein less than 25% of said spots are fully penetrated into said center ply.

28. The invention of claim 27 wherein less than 10% of said spots are fully penetrated into said center ply.

29. A three-ply laminate comprising:
 A. Absorbent tissue outer plies each having a basis weight of 7 to 130 g/m$^2$;
 B. A flexible tear reinforcing center ply having a tear strength of at least 300 gms.; and
 C. A thermoplastic adhesive material,
wherein one of said outer plies is bonded to one surface of said center ply with a thermoplastic net of adhesive material, originally having uniformly spaced solid thick thermoplastic masses connected by oriented thermoplastic strands which are thinner than said solid masses; and wherein less than 30% of said solid masses are fully penetrated into the center ply; wherein the other outer ply is bonded to the other surface of the center ply with a thermoplastic adhesive material having a uniformly spaced pattern of spots with less than about 30% of said spots fully penetrating into the center ply; and wherein said laminate has an Elmendorf tear strength of at least 50% of the tear strength of the reinforcing center ply, said laminate having a dry peel strength of greater than 100 gms.

30. The invention of claim 29 wherein said (B) is a non-woven material selected from the group consisting of spunbonded, fiber-entangled, needle punched and adhesive bonded after carding materials; and wherein said (B) has a tear strength of at least 500 gms.

31. The invention of claim 30 wherein (B) is a spunbonded material with a tear strength of at least 900 gms.

32. The invention of claim 31 wherein said tear strength is at least about 1100 gms.

33. The invention of claim 32 wherein (B) has a tear strength of about 1600 gms.

34. The invention of claim 29 wherein said absorbent tissue outer ply has a basis weight of from about 7 to 100 g/m$^2$.

35. The invention of claim 34 wherein said tissue has a basis weight from 7 to 60 g/m$^2$.

36. The invention of claim 35 wherein said tissue has a basis weight from 7 L to 20 g/m$^2$.

37. The invention of claim 29 wherein said thermoplastic adhesive material is made from a material selected from the group consisting of thermoplastics of high and low density polyethylene, polypropylene, polyesters, polyamides, ethylene copolymers such as ethylene-propylene copolymers, ethylene-vinyl acetate copolymers, and ethylene-methyl acrylate copolymers.

38. The invention of claim 37 wherein said adhesive is high density polyethylene.

39. The invention of claim 29 wherein said thermoplastic net adhesive is an open network which has: 10 to 200 masses per sq.cm., a basis weight of 5 to 50 g/m$^2$, and a thickness of 0.02 to 0.40 mm.

40. The invention of claim 39 wherein said network has: 20 to 150 masses per sq.cm., a basis weight of 5 to 40 g/m$^2$, and a thickness of 0.05 to 0.3 mm.

41. The invention of claim 40 wherein said network has: 50 to 100 masses per sq.cm., a basis weight of 5 to 20 g/m$^2$, and a thickness of 0.05 to 0.2 mm.

42. The invention of claim 29 wherein less than 25% of said masses are fully penetrated into said center ply.

43. The invention of claim 42 wherein less than 10% of said masses are fully penetrated into said center ply.

44. The invention of claim 29 wherein said laminate has an Elmendorf tear strength equal to 60% to 100% of the tear strength of the reinforcing center ply.

45. The invention of claim 44 wherein said Elmendorf tear strength is 70% to 100% of the tear strength of said center ply.

46. The invention of claim 45 wherein said dry peel strength is greater than 150 gms.

47. The invention of claim 46 wherein said dry peel strength is greater than 250 gms.

48. The invention of claim 29 wherein said laminate has a water wet peel strength of greater than 100 gms.

49. The invention of claim 48 wherein said water wet peel strength is greater than 160 gms.

50. The invention of claim 29 wherein said laminate has an acetone wet peel strength of greater than 80 gms.

51. The invention of claim 50 wherein said acetone wet peel strength is greater than 160 gms.

52. The invention of claim 51 wherein said thermoplastic adhesive is solvent resistant.

53. The invention of claim 29 wherein said absorbent tissue outer plies each has:
 1. a basis weight of 7 to 130 g/m$^2$;
 2. an oil absorption capacity greater than 175 g/m$^2$; and
 3. a low load thickness of 0.4 to 1.2 mm;
wherein said laminate has:
 1. an oil absorption capacity of greater than 300 g/m$^2$;
 2. an Elmendorf tear strength of greater than 225 gms., said laminate having a tear strength greater than 60% of the tear strength of the reinforcing center ply;

3. a wet abrasion weight loss of less than 40 mg.;
4. a thickness of from 0.5 to 2.0 mm;
5. a tubular crush of less than 850 gms.; and
6. a heat resistance of greater than 200° C.

54. A method of making a three-ply laminate having improved tear strength comprising bonding:
   A. Absorbent tissue outer plies each having a basis weight of 7 to 130 g/m² to upper and lower surfaces of
   B. A flexible tear reinforcing center ply; using
   C. A thermoplastic net adhesive material having uniformly spaced solid thick thermoplastic masses connected by oriented thermoplastic strands which are thinner than the solid masses;

said outer plies being bonded to the upper and lower surfaces of said center ply by combining said plies at a temperature sufficiently high to melt said net adhesive material and at a pressure sufficient to obtain good lamination peel strength with less than 30% of said solid mass fully penetrating into the center ply; wherein said laminate has an Elmendorf tear strength equal to at least 50% of the tear strength of the reinforcing center ply, and wherein said laminate has a dry peel strength of greater than 100 gms.

55. A method of making a three-ply laminate having improved tear strength comprising bonding:
   A. Two absorbent tissue outer plies each having a basis weight of 7 to 130 g/m² to upper and lower surfaces of
   B. A flexible tear reinforcing center ply; with
   C. A thermoplastic solvent resistant adhesive material, wherein said adhesive is applied in a uniformly spaced pattern of spots on the sides of said outer plies which are bonded to said upper and lower surfaces of said center ply, said adhesive being applied in a molten state; said bonding done at a pressure sufficient to obtain good lamination strength with less than about 30% of said spots fully penetrated into the center ply; wherein said laminate has an Elmendorf tear strength equal to 50% up to 100% of the tear strength of the reinforcing center ply, and wherein said laminate has a dry peel strength of greater than 100 gms.

56. A method of making a three-ply laminate having improved tear strength comprising:
   A. Absorbent tissue outer plies each having a basis weight of 7 to 130 g/m² to upper and lower surfaces of
   B. A flexible tear reinforcing center ply;
   C. Thermoplastic adhesive material;

said method comprising the following steps:
   1. Binding one of said outer plies to one surface of said center ply with a thermoplastic net adhesive material having uniformly spaced solid thick thermoplastic masses connected by oriented thermoplastic strands which are thinner than the solid masses; said bonding done at a temperature sufficiently high to melt said net adhesive material and at a pressure sufficient to obtain good lamination peel strength with less than 30% of said solid mass fully penetrating into the center ply; and
   2. Binding one side of the other outer ply to the other surface of said center ply using a thermoplastic adhesive material, which is applied in a uniformly spaced pattern of spots on the side of the tissue being bonded to said other surface of the center ply, said spots being applied in a molten state; said spot bonding done at a pressure sufficient to obtain good lamination strength with less than about 30% of said spots fully penetrated into the center ply;

wherein said laminate has an Elmendorf tear strength equal to 50% up to 100% of the tear strength of the reinforcing center ply, and wherein said laminate has a peel strength of greater than 100 gms.

* * * * *

UNITED STATES PATENT AND TRADEMARK OFFICE
CERTIFICATE OF CORRECTION

PATENT NO. : 4,507,351

DATED : March 26, 1985

INVENTOR(S) : Robert C. Johnson and Larry E. Burns

It is certified that error appears in the above-identified patent and that said Letters Patent is hereby corrected as shown below:

```
Title page, [73] Assignee, "Proctor" should be
--- Procter ---.

Col. 5, line 10, "#0-199-white" should read
      --- #0-119-white ---.

Col. 6, line 68, "level" should read --- travel ---.

Col. 13, line 47, "4,133,911" should be --- 4,113,911 -- .

Col. 13, line 59, after "laminate" and before "a" insert
      --- makes ---.

Col. 13, line 61, "was" should read --- and ---.

Col. 16, line 13, after "7" and before "to" delete "L".
```

Signed and Sealed this

First Day of October 1985

[SEAL]

Attest:

Attesting Officer

DONALD J. QUIGG

Commissioner of Patents and Trademarks—Designate